United States Patent [19]
Krauss

[11] Patent Number: 5,283,930
[45] Date of Patent: Feb. 8, 1994

[54] CORD CLAMP WITH HASP FOR FOLDED CORDS AND THE LIKE

[75] Inventor: Mark Krauss, E. Greenwich, R.I.

[73] Assignee: American Cord & Webbing Co., Inc., Woonsocket, R.I.

[21] Appl. No.: 17,473

[22] Filed: Feb. 12, 1993

[51] Int. Cl.⁵ .............................................. F16G 11/00
[52] U.S. Cl. ................................... 24/129 R; 24/130; 24/132 R
[58] Field of Search ............ 24/129 R, 129 A, 129 C, 24/129 D, 132 R, 132 AA, 132 WL, 136 L, 265 H, 130, 131 R

[56] References Cited

U.S. PATENT DOCUMENTS

| | | | |
|---|---|---|---|
| 520,318 | 5/1894 | Knap | 24/129 A |
| 545,760 | 9/1895 | Ashley . | |
| 751,090 | 2/1904 | Marold . | |
| 1,229,855 | 6/1917 | Alexander | 24/129 A |
| 2,781,212 | 2/1957 | Jugle . | |
| 3,745,614 | 7/1973 | Tsang | 24/132 R |
| 3,896,527 | 7/1975 | Miller . | |
| 3,897,161 | 7/1975 | Reinwall . | |
| 4,124,922 | 11/1978 | Speedie . | |
| 4,236,281 | 12/1980 | Bottum | 24/132 R |
| 4,443,914 | 4/1984 | Christensen . | |
| 4,461,059 | 7/1984 | Bury | 24/129 R |
| 4,493,134 | 1/1985 | Karr | 24/132 R |
| 4,592,117 | 6/1986 | Ruehl . | |
| 4,615,532 | 10/1986 | Biller . | |
| 4,649,664 | 3/1987 | Mahan | 24/130 |
| 4,719,671 | 1/1988 | Ito . | |
| 4,835,822 | 6/1989 | Savall . | |
| 5,136,756 | 8/1992 | Krauss | 24/129 R |

Primary Examiner—Victor N. Sakran
Attorney, Agent, or Firm—Kane, Dalsimer, Sullivan, Kurucz, Levy, Eisele & Richard

[57] ABSTRACT

A clasp of for a folded cord includes two portions which make to form a clasp body thereby capturing the folded cord therebetween. The portions include gripping teeth for defining a tortious path for the cord.

11 Claims, 2 Drawing Sheets

CORD CLAMP WITH HASP FOR FOLDED CORDS AND THE LIKE

BACKGROUND OF THE INVENTION

A. Field of the Invention

This invention is directed toward a clamp with a hasp for fastening a folded cord or rope. The fastening means is a hinged component of the clamp which folds upon itself and is provided with locking means to maintain it in the folded position.

B. Description of the Prior Art

Various clamps are known in the prior art. For instance, U.S. Pat. No. 4,461,059 discloses a wire clamp consisting of a U-shaped housing open on one side. On two opposed sidewalls of the housing, there is provided a plurality of fins angled backwards so that a wire entrained between the fins can be pulled in one direction, but not the other. Two arms 50, 52 are provided to insure that the wire moves laterally out of the housing. At one end, the housing is formed with an integral closed hoop 64.

U.S. Pat. No. 3,629,909 discloses a plastic wire clamp consisting of two pieces: a) U-shaped member with angled side walls, and b) an insert which is wedged into the U-shaped member. The insert has internal teeth 60 for grabbing the wire. The U-shaped member does not contact the wire itself.

U.S. Pat. No. 3,034,189 discloses a clasp for a wrist band consisting of two clamping members connected by a hinge. The hinge is disposed longitudinally in parallel with the band. On the inside surfaces, the clamping members include spikes 32 for engaging the band.

U.S. Pat. No. 5,136,756 issued to the present inventor discloses a cord clamp with hasp for engaging the end of a cord.

While the aforedescribed clamps may function to attach and to hold wires, they have certain disadvantages. They may require an insert and thus can not be of a single piece construction (U.S. Pat. No. 3,629,909) or they may not anchor a cord or rope in place since they permit the cord to be moved in at least one direction (U.S. Pat. No. 4,461,059). It is also noted that these prior art clasps may not possess means such as a hook for fastening the clasped cord to some other objects such as a wall or a post (U.S. Pat. Nos. 3,034,189 and 3,629,909).

OBJECTIVES AND SUMMARY OF THE INVENTION

It is an objective of the invention to provide a cord clasp with hasp which fastens securely to a folded cord, rope or the like.

It is a further objective of the invention to provide a cord clasp with hasp which is provided with a means for fastening the folded cord to another objective such as a wall or post.

It is further objective to provide a cord clasp with a hasp that is of a single piece construction.

It is still a further objective of this invention to provide a cord clasp with hasp which can be molded in one piece from a simple two piece mold.

Yet another objective is to provide a clasp forming a tortious path for the cord to increase resistance to slipping of the cord out of the clasp.

Other objectives of the invention shall become apparent from the following disclosure.

The invention is a cord clasp with a hasp of a single piece construction for fastening upon a folded cord or a rope. The hasp, or fastening means, is a hinged component of the clamp which is formed of two halves joined at a hinge so that the two are able to fold upon themselves. The two halves are provided upon their interior with means to grip and be securely fastened to the folded rope or cord along a tortious path. Means are provided to lock the clamp in its folded position. The cord clamp is further provided at one end with a hook which permits the cord clasp to be fastened to some other object, such as a wall or a post.

DETAILED DESCRIPTION OF THE INVENTION

Figure 1:
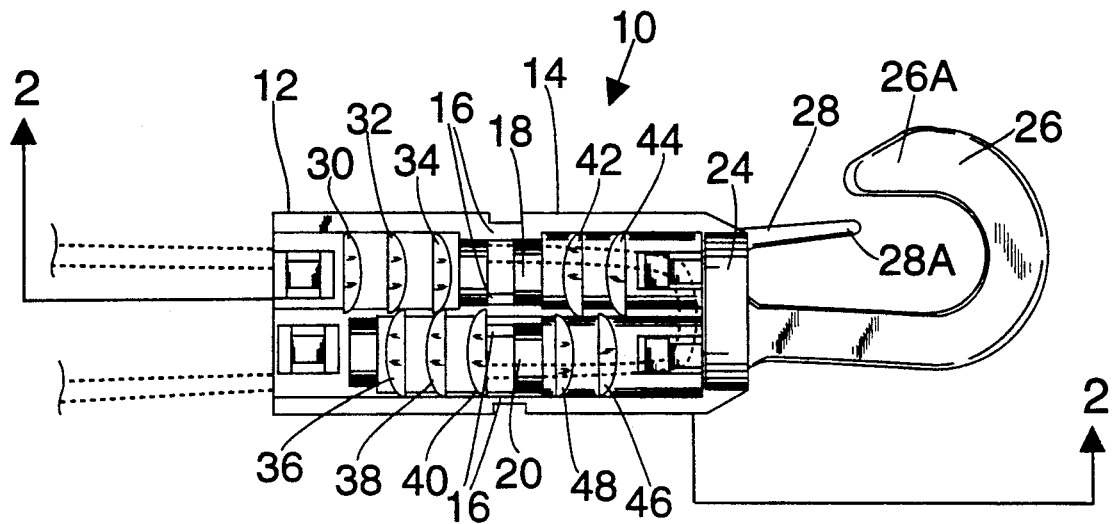
FIG. 1 is a top view of the cord clamp in its open position.

A cord clamp with hasp 10 constructed in accordance with this invention has two portions 12 and 14 which are joined at one end by hinges 16, which allow the two halves to pivot between an open and a closed position. The two portions 12, 14 define two aperture 18, 20 therebetween through which a cord 22 or rope can be positioned into the interior of the cord clasp 10. One portion 14 includes of a flange 24 to which is attached a hook 26 which serves as a means for attaching the cord clasp 10 to some other object such as a wall or post. Preferably, a fastening guard 28 projects from the flange 24 toward the end 26a of hook 26. The fastening guard 28 projects for a distance so that its tip 28a is disposed just under the end 26a of the hook 26 to capture a hoop or other mounting means for mounting clamp 10 to an object.

Figure 6:
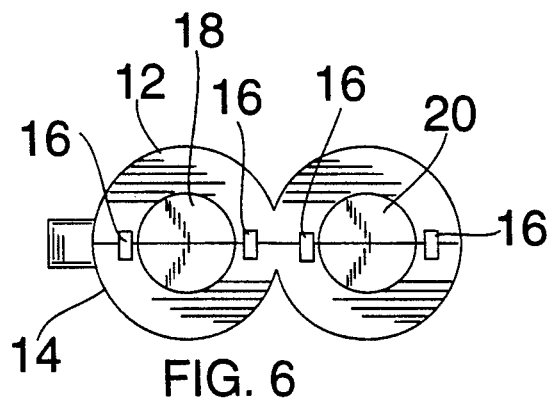
FIG. 6 is an end view of the clamp in the closed position.
Figure 2:
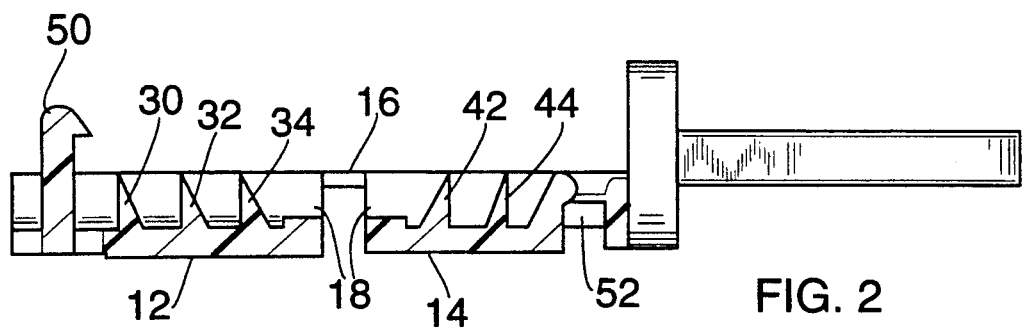
FIG. 2 is a cross-sectional side view of the cord clamp in its open taken along line 2—2 in FIG. 1.
Figure 4:
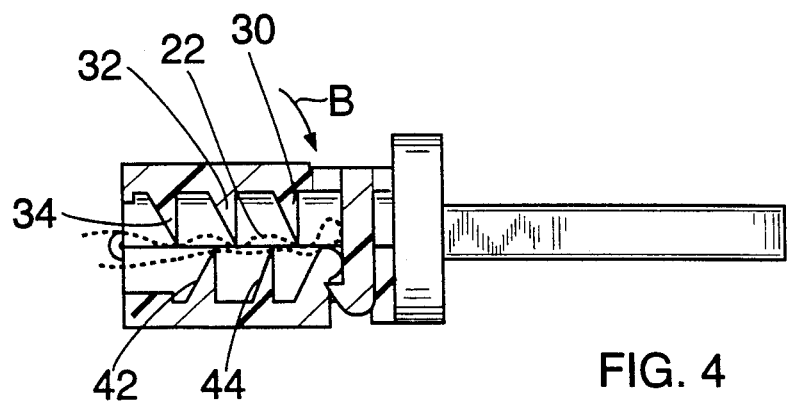
FIG. 4 is a cross-sectional side view of the cord clamp in its closed position.

Each of the portions 12, 14 is shaped generally in the shape of two half-cylinders placed side-by-said as best seen in FIG. 6 with each portion having two parallel inner surface which are generally semi-cylindrical on these inner surface, each portion 12, 14 is formed with two sets of gripping teeth on each of the surfaces, oriented in opposite directions. More specifically, portion 12 has a first set including of teeth 30, 32, 34 which generally have a trapezoidal cross-section oriented away from opening 18. Portion 12 also has a second of set of teeth, including teeth 36, 38, 40 oriented toward from opening 20. Portion 14 also has a first set of teeth 42, 44 aligned axially with the first set of teeth 30, 32, 34 with second set of teeth 46, 48 axially aligned with teeth 36, 38, 40. As best seen in FIG. 2, teeth 42, 44 are oriented to extend away from opening 18, just like teeth 30, 32, 34. Similarly, teeth 46, 48 are oriented toward opening 20 just like 36, 38, 40. In addition, the gripping teeth are arranged so that when the two portions are folded upon themselves these gripping teeth arranged in a staggered manner to define two parallel tortious path each extending substantially along the length of the hasp. One tortious path is provided by the first sets of teeth 30, 32, 34, 42 44 of each portion, (seen in FIG. 4), while the second path is defined by the second sets of teeth 36, 38, 40, 46, 48. When a cord 20 is placed between the two halves it is crimped between the staggered gripping teeth and forced along the tortious paths around the gripping teeth and be held securely in place as shown in FIG. 4.

The cord clasp is also provided with a locking means for locking the two portions in the closed position. The locking means includes a protrusion 50 formed on portion 12 and a mating opening 52 formed in portion 14. When the two portions 12 and 14 are folded upon each other, the protrusion 50 is inserted into and fictionally engaged in opening 52, thereby locking the cord clasp 10 in its closed position.

Figure 5:
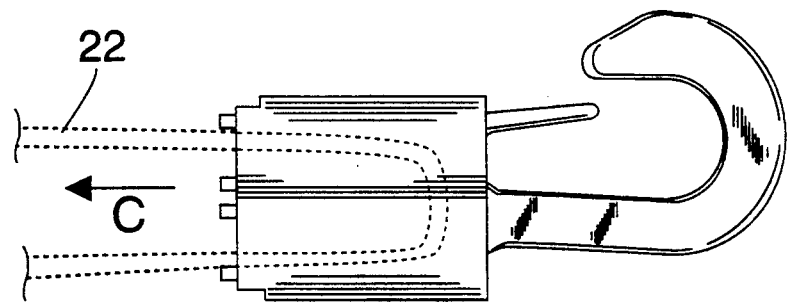
FIG. 5 is a top view of the cord clamp in its closed position with a cord inserted.
Figure 3:
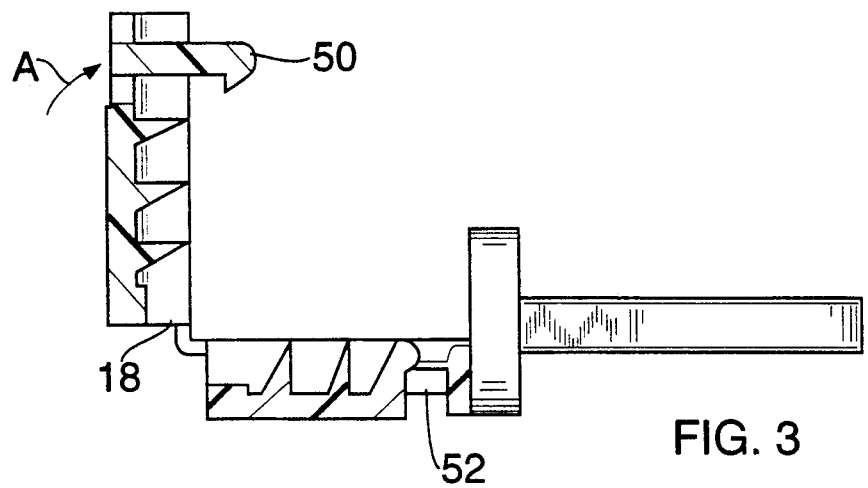
FIG. 3 is a cross-sectional side view similar to FIG. 2 with the clasp partially closed.

The cord clasp 10 described above is used as follows. The two portions 12, 14 are opened to the position shown in FIGS. 1 and 2 wherein they are substantially coplanar. A cord 22, rope or similar elongated filament to be secured is then inserted through one of the openings, such as 18 and then out through the other opening 20 with the portion of the cord extending therebetween being laid across the top of the gripping teeth 42, 44, 46, 48 of portion 14. Portion 12 is then folded over portion 14 in the direction indicated by arrows A and B in FIGS. 3 and 4 respectively until projection 50 snaps into opening 52 thereby locking the clasp in the closed position of FIGS. 4, 5 and 6. In this position, cord 22 is folded in the clamp so that it extends through the two porions paths extending along the length of clasp 10 and is firmly secured and clamped therebetween. It should be note that because the gripping teeth are oriented in the same direction along the cord, the clasp is biased in the sense that it will resists better forces along one direction on cord 22 then in the other. More specifically, as viewed in FIG. 5, the clasp resists better forces directed along arrow C in FIG. 5.

The cord clasp of the present invention is of a single piece, unitary construction and preferably is constructed of thermoplastic material. It can be molded from a simple two piece mold, which is inexpensive.

Obviously numerous modifications may be made to the invention without departing from its scope as defined in the appended claims.

I claim:

1. A molded cord clasp of single piece construction comprising:
   a first body portion;
   a second body portion;
   an integral hinge means for integrally hingedly coupling said first and second body portions between a closed and an open position;
   locking means for locking said body portions into a clasp body in said closed position, said clasp body having a first and a second opening; and
   first and second gripping means disposed respectively on said first and second body portions and cooperating to define two tortious paths between said first and second opening, said gripping means being arranged and constructed to grip a cord folded in said clasp body between and extending through said first and second openings into said two tortious paths.

2. The clasp of claim 1 wherein said clasp body has a face and said openings are disposed on said face.

3. The clasp of claim 1 wherein said cord is folded so that it extends along the two paths.

4. The clasp of claim 1 wherein said tortious path include a firth path portion extending from said first opening and a second path portion extending from said second opening, the first and second path portions being in parallel.

5. The clasp of claim 1 further comprising a hoop attached to said clasp body.

6. The clasp of claim 1 wherein means within the clasp body receive the folded part of the cord.

7. A molded clasp of single piece construction for securing a section of a folded cord, said clasp comprising;
   a first body portion with a first portion inner surface and a plurality of first portion gripping teeth disposed on said first portion inner surface;
   an integral second body portion with a second portion inner surface and a plurality of second portion gripping teeth disposed on said second portion inner surface;
   an integral hinging means for integrally hinging said body portions between an open and a closed position;
   locking means for locking said portions in said closed position;
   said first and second body portions defining two tortious paths for receiving the folded part of the cord; and
   said gripping teeth cooperating to grip said cord when said second of said cord is folded in said body portions.

8. The clasp in claim 7 wherein said portions define in said closed position a clasp body, said clasp body having a first opening and a second opening, and with said cord folded within said clasp body and extending through said first and second openings.

9. The clasp of claim 8 wherein said teeth are oriented in a common direction along said cord.

10. The clasp of claim 8 wherein a plurality of gripping teeth includes a first set of teeth defining a first tortious path aligned with said first opening and a second set of teeth defining a second tortious path aligned with said second opening through said clasp body.

11. The clasp of claim 10 wherein said first and second tortious paths are substantially parallel.

* * * * *